Aug. 13, 1957   M. J. JALKANEN   2,802,572
SCREEN UNIT FOR TREATING SOLID MATTER OF A SUSPENSION
Filed Dec. 9, 1952   2 Sheets-Sheet 1
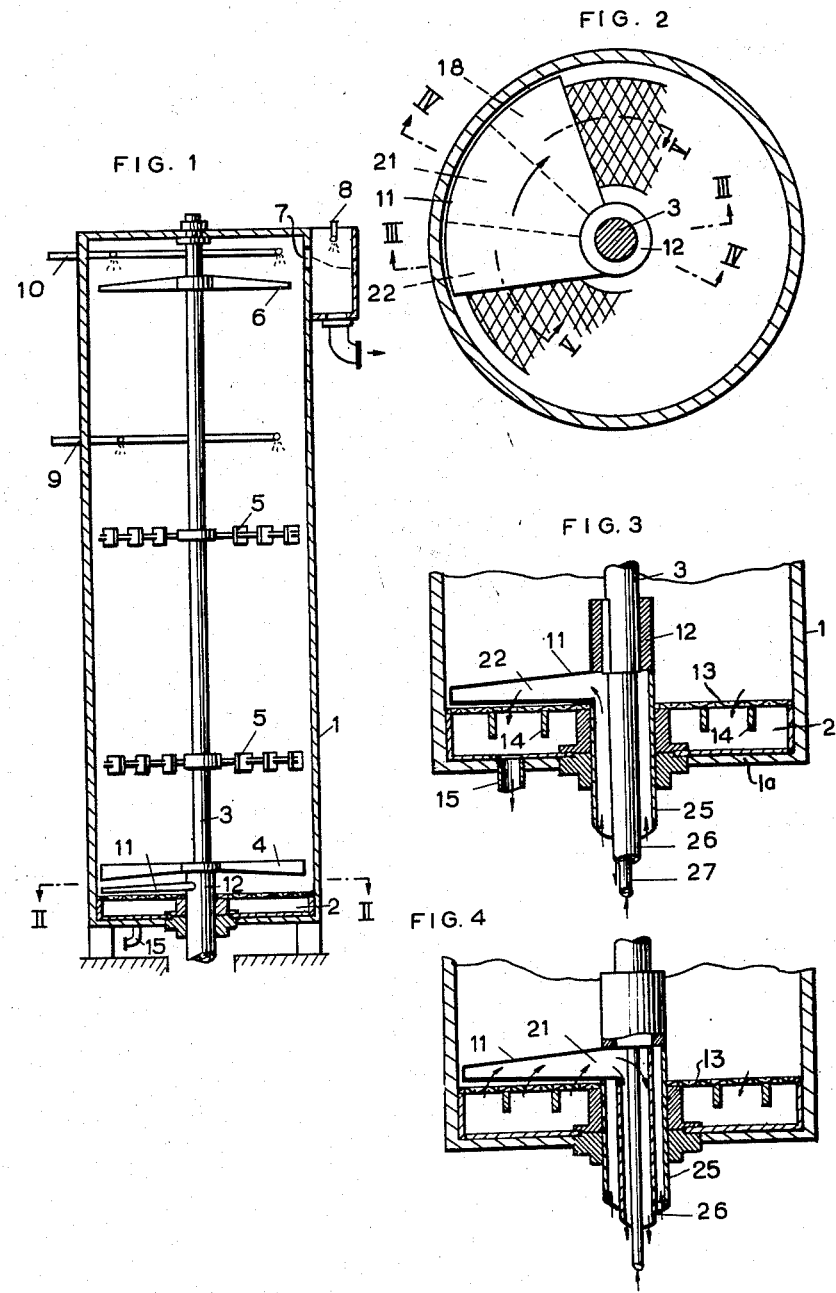

Aug. 13, 1957  M. J. JALKANEN  2,802,572
SCREEN UNIT FOR TREATING SOLID MATTER OF A SUSPENSION
Filed Dec. 9, 1952  2 Sheets-Sheet 2
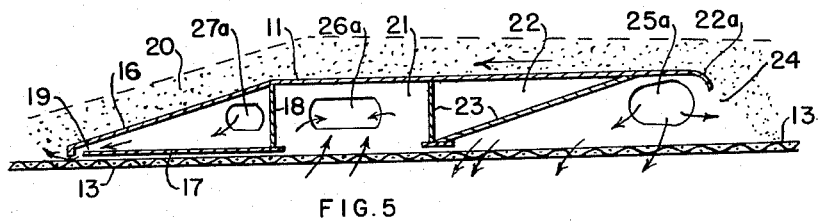
FIG.5
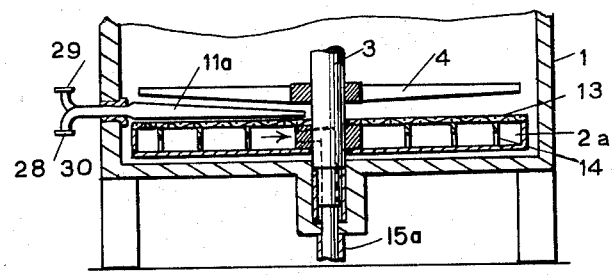
FIG.6
FIG.7
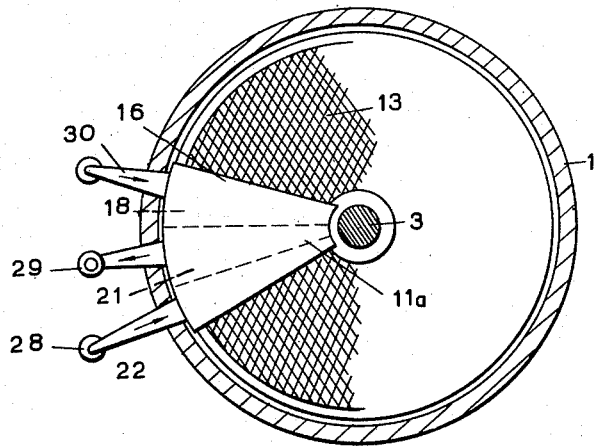
Matti Johannes Jalkanen

United States Patent Office 2,802,572
Patented Aug. 13, 1957

2,802,572

SCREEN UNIT FOR TREATING SOLID MATTER OF A SUSPENSION

Matti Johannes Jalkanen, Rauma, Finland, assignor to Rauma-Repola Oy, Rauma, Finland Application December 9, 1952, Serial No. 324,934

Claims priority, application Finland September 5, 1952

11 Claims. (Cl. 210—82)

In continuously separating solid matter of a suspension by filtration, which solid matter stays on a screen surface appropriate therefor, the liquid separating pressure difference remains very small. Moreover the solid matter, depending upon its nature, retains more or less suspension liquid, which must be removed by washing with some liquid. Where complete liquid separation and least possible dilution with wash liquid is of significance it has been necessary to adopt the multistage counter-current principle for washing this solid matter. Heretofore when attempts have been made to operate a screen surface continuously and under high pressure, e. g., on the bottom of a high vertical tank, great difficulties have been encountered in stripping strained solids from the screen surface as also in preventing clogging of screen surface perforations for the lack of a suitable unit device.

The screen unit according to the present invention obviates these defects and renders possible the washing of solids in suspension free of suspension liquid by means of wash liquid according to the counter-current principle while separately recovering solid matter and suspension liquid of concentrating solid matter in one and the same unit as subsequent steps and the unit according to the invention is chiefly characterized in the provision of a screen chamber adapted to operate as screening means and arranged within the washing tank or precipitation tank and in the provision of doctor means arranged adjacent to the screening surface level of said chamber, said doctor means having arranged therein ducts for leading suspension and dye stuff and a doctor blade for stripping solids collected on the screen chamber surface shaped to form a spheroid of revolution.

For the better understanding of the invention various screen units embodying the invention are illustrated in the accompanying, partly schematic drawings, wherein—

Fig. 1 is a somewhat diagrammatic view of the screen unit as arranged on the bottom of a vertical tank.

Fig. 2 is a plan view taken on the line II—II of Fig. 1.

Figs. 3, 4 are sectional views taken respectively on the line III—III, IV—IV of Fig. 2.

Fig. 5 is a transverse sectional view taken of the doctor means on the line V—V of Fig. 2.

Fig. 6 is, in part, a vertical section through a unit embodying the invention and having a stationary doctor means and rotating screen chamber.

Fig. 7 is a plan view of the embodiment shown in Fig. 6.

On the bottom of a vertical tank 1 is arranged a stationary screen chamber 2. Rigidly secured to a shaft 3 are rotatable paddle means 4 for leading the stock away from the screen surface and disposed above said paddle means along the length of the shaft are agitator arms 5. Mounted at the top of the shaft are discharge wings 6 for treated stock. The upper end of the vertical tank is provided with a discharge opening 7 and a pipe 8 for regulating the consistency of the discharging stock and wash liquid supply pipes 9 and 10.

To the lower end of the shaft 3 is rigidly secured a doctor means 11 and pipes 12 for supplying stock and liquid. The upper surface of the screen chamber is formed by a perforated strainer or screen surface 13 supported by bracket irons 14 if arranged within the screen chamber. The bracket irons are so arranged as to permit the liquid admitted through the screen surface into the interior of the chamber to flow freely therewithin while leading, when necessary, a part of the liquid away therefrom by way of pipe 15.

The doctor means 11 is provided on the leading edge thereof with an inclined top surface 16, which removes the solid matter accumulated on the strainer surface and is shaped on the lower face thereof to form a bottom plate 17 parallel with the screen surface level. The thus formed doctor chamber 18 is supplied with liquid from pipe 27 through opening 27a and provided on its leading edge with holes or slits 19 through which liquid from an external source can be discharged. In the embodiment according to Fig. 2, said liquid when discharging through said slits 19 serves to remove solid matter 20 accumulated on the screen surface and to prevent it from being rubbed between the screen surface and the packing surface of the doctor means.

For admitting suspension and for spreading the same upon the straining bottom, as also for keeping the straining surface clean, is arranged in the lower end of the said shaft 3 by means of a sleeve 12, a double pipe 25, 26 adapted also to function as the lower end of the rotating shaft. Said double pipe 25, 26 extends downwardly through the straining bottom 13, the chamber 2 and a stuffing box in the bottom proper 1a of the tower. Mounted on this pipe 25, 26 above the straining bottom is the doctor means 11, which rotates with the shaft 3. The top plan view of this doctor means is in shape a sector (Fig. 2) as shown in Fig. 5, the leading part of the doctor means consists of an inclined surface 16 serving as doctor proper, a wall section 18, and a bottom plate 17 substantially in a plane parallel with that of the straining bottom 13 and having a clearance between the leading edge thereof and the straining bottom 13 so small as is mechanically possible between surfaces gliding by but not contacting each other. This doctor means is further divided by an approximately radial wall section 23 into two radial ducts, cleaning duct 21 and inlet or feed duct 22, with about the same clearance against the straining bottom by the wall edges thereof as the doctor proper.

The cleaning duct 21 is open to the straining bottom 13 but is otherwise closed by the substantially radial and vertical walls 18 and 23 shown in Fig. 5 and at the top by the substantially horizontal wall 11. At 26a is indicated a liquid outlet for liquid strained through the straining bottom into the section 21, the liquid being discharged through pipe 26 (Fig. 4). The rear section, inlet duct 22, is open to the straining bottom and also at the back thereof, as at 24. The top of this canal is closed by a horizontal wall 22a. At 25a is indicated an inlet for suspension admitted through the outer pipe 25 (Fig. 3).

For the operation of the straining means it is necessary to arrange the levels and/or pressures of the discharging liquids and pulp or pulp suspensions in a manner hereinafter explained.

$P_1$ = pressure of incoming suspension.

$P_2$ = pressure exerted by suspension within the treating tower against the upper surface of the straining bottom 13 when the tower is full of solid matter and liquid up to the ejection level indicated at 7.

$P_3$ = partial pressure exerted by liquid against the straining surface, when tower is full of solid material, but surface of solid liquid is below the ejection level indicated at 7.

$P_4$ = pressure of liquid in strainer chamber 2.

$P_5$, $P_6$ = pressures resisting the outflow of liquid from strainer chamber 2.

In this system there are now the following acting pressure differences.

$p_2 = P_1 - P_2$, pressure difference needed to force the stock into the tower through pipe 25a.

$p_4 = P_2 - P_4$ is the pressure difference, which forces liquid through straining surface 13 into strainer chamber 2.

$p_5 = P_4 - P_5$ is pressure difference which liquid from the chamber 2 through the straining bottom 13 into cleaning canal 21 in the doctor means and then through pipe 26 away from the tower.

$p_6 = P_5 - P_6$ is the pressure difference which forces liquid away from the strainer chamber 2 through outlet 15. This $P_6$ should always be less than $P_5$ to insure the discharge of liquid through the doctor means.

When the straining means arranged into a treating tower is used for concentration purposes, level of solid liquid in the treating tower, corresponding to pressure $P_3$, is kept under the height of ejection level indicated at point 7. Then in place of pressure difference $p_4 = P_2 - P_4$, the difference $p_4 = P_3 - P_4$ takes effect.

The straining surface is so dimensioned that besides suspension liquid also any desired amount of wash liquid can pass therethrough and seep through the solid matter to the strainer surface. The solid matter moves slowly upwardly in consequence of fresh solid matter being fed continuously onto the straining surface and under the solid matter already within the tower. In other words, the wash liquid and solid matter move in counter-current flow to each other.

When the straining means is in operation the doctor means turns over the straining bottom and dislodges by its doctor proper 19 any solid matter accumulated on the straining bottom through straining. Said dislodged solid matter then glides up and over said doctor means.

When the doctor means then turns over the straining bottom cleaned in the hereinabove described manner, strained liquid will flow from the chamber 2 into the cleaning canal 21 in consequence of pressure difference $p_5$ and free the straining surface perforations of any remaining solids, which together with the liquid are withdrawn from the cleaning canal 21 through the discharge opening 26a and pipe 26.

Thus the inlet canal 22 of the doctor means will, in turning, move over straining bottom surface cleaned in the hereinabove described manner. When suspension is now forced into this inlet canal 22 by pressure difference $p_2$ through the opening 25a, pipe 25 and through the tubular passage formed between the outer pipe 25 and the inner pipe 26 in the shaft, the admitted suspension will be spread in the rotation direction of the doctor means, while liquid from the suspension will strain through the straining bottom into the chamber 2 causing the suspension to thicken, and will partly flow through the walless outlet side 24 into the tower further to thicken under the pressure of the pulp in the tower, which has slides over the top surface of the doctor means, also in this way the continually incoming pulp forces the pulp already in the tower to travel upwards from the straining bottom.

In the thickening stage upon the straining surface and in the tower, the concentration of the solid matter may reach a so high degree, that it is not any more in form of a suspension.

In the modification of the invention shown in Figs. 6 and 7, the doctor means 11a is arranged stationary and the strainer chamber 2a rotatable. In this instance the pipes 28, 29 respectively for admitting suspension and withdrawing a part of the liquid can be passed through the tower wall. The rest of the strained liquid is withdrawn from the chamber through the pipe 15a in the shaft.

In a tower so provided as has hereinabove been described, the upwardly travelling thickened solid matter will be subjected to counter-current wash when wash water is admitted through the pipes 9 and 10. If it is the object to obtain relatively thick washed stock, wash liquid is admitted solely through pipe 9. Then the level of solid liquid in the tower can be kept below the ejection level indicated at 7. Within the space above this level of solid liquid, liquid will seep downwards from the solid matter and concentration results. If the object is only to thicken the suspension no wash water is used.

Depending upon the future use of the stock and the size of the tank several screen chambers may be arranged in one and the same tank as also each screen surface may be provided with one or more doctor means.

The screen surface according to the present invention may be arranged within variously shaped pressure tanks or vessels not under pressure.

The screen surface hereinabove described is well adapted for use as a suction side screen in circulation systems wherein liquid is drawn out of stock through the screen surface to the outside of the tank for any treatment and wherein the suspended matter tends to clog the suction screen.

The hereinabove described screen device arranged into washing tanks is especially adapted for use in the wash of fibrous materials of the chemical pulp and paper making industries, and in completely separating and recovering cooking liquor, reaction liquids, etc.

I claim:

1. An arrangement for continuously concentrating liquid suspensions of solid matter, comprising, in combination, a container means for receiving concentrated suspensions of solid matter; a strainer chamber means for receiving filtrate arranged adjacent said container means; a straining wall member separating said container means from said strainer chamber means; at least one doctor means arranged in said container means on said straining wall member, said doctor means and said straining wall member being movable relative to each other, said doctor means engaging the entire surface of said straining wall member along an endless path during relative movement, said doctor means having an inclined surface located forwardly in the direction of relative movement, said inclined surface extending rearwardly and away from said straining wall member so as to move matter deposited on said wall member over said doctor means and into said container means, said doctor means being formed with a cleaning channel opening on said straining wall member, located rearwardly of said inclined surface and adapted to suck filtrate from said strainer chamber means for cleaning said straining wall member, said doctor means being further formed with an inlet channel for said suspension, said inlet channel being located rearwardly of said cleaning channel and opening on said straining wall member and rearwardly so that said suspension is supplied to a portion of said straining wall member cleaned by said cleaning channel and then covered by matter having moved over said inclined surface; outlet means connected to and communicating with said cleaning channel; and inlet means connected to and communicating with said inlet channel.

2. An arrangement for continuously concentrating a liquid suspension of solid matter, comprising, in combination, a container tower for receiving concentrated suspensions of solid matter; a strainer chamber means located at the bottom end of said container tower for receiving filtrate; a straining bottom located between said container tower and said strainer chamber means; at least one doctor means arranged in said container tower on said straining bottom, said doctor means and said straining bottom being rotatable relative to each other, said doctor means moving over the entire surface of said straining bottom along a circular path during relative movement, said doctor means having an inclined surface located forwardly in the direction of relative rotation, said inclined surface extending rearwardly and upwardly with respect to the direction of relative rotation so as to move matter deposited on said bottom over said doctor means and upwardly into said container tower, said doctor means being formed with a cleaning channel opening on said straining bottom and located rearwardly of said inclined surface and adapted to suck filtrate from said strainer chamber means for cleaning said straining bottom, said doctor means being further formed with an inlet channel for said suspension, said inlet channel being located rearwardly of said cleaning channel and opening on said straining bottom and rearwardly so that said suspension is supplied to a portion of said straining bottom cleaned by said cleaning channel and underneath matter having moved over said inclined surface into said container tower; outlet means communicating with said cleaning channel; and inlet means communicating with said inlet channel.

3. An arrangement for continuously concentrating a suspension of solid matter, comprising, in combination, a container tower for receiving concentrated solid matter; a strainer chamber means located at the bottom end of said container tower for receiving filtrate; a straining bottom located between said container tower and said strainer chamber means; at least one doctor means arranged in said container tower on said straining bottom, said doctor means being rotatable and moving over the entire surface of said straining bottom during rotation, said doctor means having an inclined surface located forwardly in the direction of rotation, said inclined surface extending rearwardly and upwardly with respect to the direction of rotation so as to move matter deposited on said bottom over said doctor means and upwardly into said container tower, said doctor means being formed with a cleaning channel extending in radial direction and opening on said straining bottom and located rearwardly of said inclined surface and adapted to suck filtrate from said strainer chamber means for cleaning said straining bottom, said doctor means being further formed with an inlet channel for said suspension, said inlet channel extending in radial direction and being located rearwardly of said cleaning channel and opening on said straining bottom and rearwardly so that said suspension is supplied to a portion of said straining bottom cleaned by said cleaning channel and underneath matter having moved over said inclined surface into said container tower; a first tubular shaft located in the axis of said tower and secured to said doctor means and rotating with the same, the interior of said first tubular shaft communicating with one of said channels and constituting an inlet means; a second tubular shaft located within said first tubular shaft and secured to said doctor means, the interior of said second tubular shaft communicating with the other of said channels and constituting an outlet means.

4. An arrangement as claimed in claim 3 wherein said straining bottom includes a circular perforated plate having a smooth top surface and a supporting structure fixedly secured to the bottom face of said perforated plate and supported on said container tower, and a sleeve extending downwardly from the center of said perforated plate and rotatably supporting said first tubular shaft.

5. An arrangement as claimed in claim 3 wherein said container tower has a bottom formed with an outlet opening for filtrate, and wherein said strainer chamber means is located within said container tower; and including a sleeve extending downwardly from the center of said straining bottom to said bottom of said container tower and rotatably supporting said first tubular shaft.

6. An arrangement as claimed in claim 3 wherein said doctor means is sector-shaped.

7. An arrangement as claimed in claim 3 wherein a plurality of symmetrically arranged sector-shaped doctor means are provided.

8. An arrangement as claimed in claim 2 wherein said strainer bottom is rotatable; a drive shaft located in the axis of said container tower and connected to said strainer bottom for rotating the same; and means for fixedly securing said doctor means to said container tower.

9. An arrangement as claimed in claim 3 wherein said strainer chamber means is provided with a discharge outlet for discharging an excess part of the filtrate not received by said cleaning channel in said doctor means.

10. An arrangement as claimed in claim 2 wherein said strainer bottom is circular and rotatable, wherein said doctor means is sector-shaped and stationary; a drive shaft located in the axis of said container tower and secured to said strainer bottom for rotating the same, said drive shaft being formed with an outlet passage connected with said straining chamber means for discharging the part of the liquid not received by said cleaning channel in said doctor means.

11. A concentrating method for a liquid suspension of solid matter comprising, in combination, the steps of continuously supplying the suspension to consecutive surface portions on one side of a perforated strainer means so that part of the suspension liquid passes to the other side of said strainer means while solid matter is deposited on the suspension receiving side of the strainer means; continuously removing said solid matter deposited on said consecutive surface portions of the perforated strainer means so as to obtain clean consecutive surface portions of said strainer means, separating the thus cleaned consecutive surface portions of the strainer means from the other surface portions on said one side of said strainer means; applying suction to the thus cleaned and separated surface portions to effect a reversed flow of a portion of said part of the suspension liquid through said strainer means in the regions of said separated surface portions in order to clean the perforations of said strainer surface of any clogging matter; and introducing fresh suspension onto the thus cleaned portion of the strainer surface underneath said removed previously deposited solid matter.

References Cited in the file of this patent
UNITED STATES PATENTS

| | | |
|---|---|---|
| 1,240,904 | Trent | Sept. 25, 1917 |
| 1,969,176 | Kirby | Aug. 7, 1934 |
| 2,220,677 | Cowles | Nov. 5, 1940 |
| 2,359,543 | Branzell et al. | Oct. 3, 1944 |
| 2,431,478 | Hill | Nov. 25, 1947 |
| 2,534,324 | Hildebrandt | Dec. 19, 1950 |